Patented Jan. 1, 1946

2,392,131

UNITED STATES PATENT OFFICE 2,392,131

PRODUCTION OF POLYMERIC COMPOUNDS

Henry Dreyfus, London, England; Claude Bonard administrator of said Henry Dreyfus, deceased No Drawing. Application November 21, 1942, Serial No. 466,477. In Great Britain January 23, 1939

12 Claims. (Cl. 260—2)

This invention is concerned with improvements in the production of highly polymeric compounds and of artificial filaments, films and other products therefrom and is a continuation-in-part of my application S. No. 316,367, filed January 30, 1940.

In recent years a great deal of research has been directed to the production from simple organic compounds of polymeric compounds of high molecular weight having properties which render them suitable for the production of filaments, films, coating compositions and other articles for which naturally occurring substances, such as resin or cellulose, and semi-synthetic substances such as cellulose derivatives have previously been employed. Usually the polymers are obtained either by causing the union of a number of unsaturated molecules containing the ethylene linkage by inter-molecular linkage at the double bonds, as in the case of polyvinyl compounds, or by a condensation process in which molecules containing two reactive radicles unite together with the elimination of water or other by-product. Polyamides are well-known examples of this type of polymer.

According to the present invention linear polymers of high molecular weight suitable for the production of filaments, foils, films and other articles are produced by linking up molecules of simple organic compounds by effecting reaction between radicles having the formula

where R and $R_1$ is each a hydrogen atom or a hydrocarbon radicle and X is an oxygen or sulphur atom, or an =NH radicle, i. e. radicles of urea, thiourea and guanidine and hydrocarbon substitution derivatives thereof, and hydroxy groups present in the organic molecules. Each of the compounds employed contains in the molecule two and only two radicles which are reactive under the conditions employed for the production of the polymer. If a compound is used which contains the radicle of urea, thiourea or guanidine or a derivative thereof and also contains an hydroxy group, then the molecules of this compound are capable of reacting intermolecularly to form the required polymer. On the other hand, if a compound is used which contains two radicles of urea, thiourea or guanidine or a derivative thereof in each molecule, then the reaction mixture must also contain a compound containing two hydroxy groups in each molecule.

An example of a radicle of a urea derivative which may be present in a reagent employed in the present process is the radicle of N.N'dimethylurea having the formula

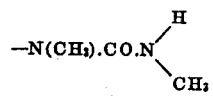

The invention will be described with particular reference to the use of reagents containing the urea radicle but it is to be understood that the description is applicable generally to the production of polymers from the classes of reagents specified. Reaction between a urea radicle or the like and a hydroxy group is capable of taking place either by the elimination of ammonia to form a carbamic acid residue or the like or by the elimination of water to form a urea or similar residue, as is shown in the following formulae:

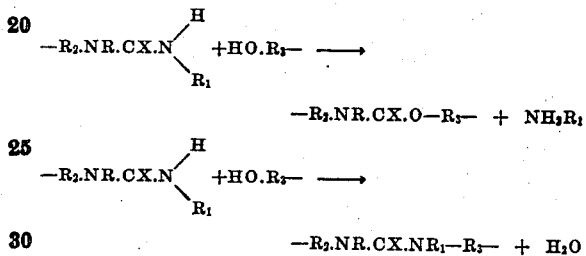

where R, $R_1$ and X have the meanings given above and $R_2$ and $R_3$ are organic radicles.

Reaction may also take place between urea radicles themselves with the formation of the biuret radicle. Similar reactions may occur with thiourea radicles to form thiocarbamic acid residues or other residues and with guanidine radicles to form e. g. iso-urea radicles. Further, it is possible for the hydroxy groups to react to form an ether linkage, though this reaction does not appear to take place to any great extent under the conditions of polymerisation usually employed. The types of reaction and their relative frequency in any particular process will depend upon the reagents employed, the proportions in which they are employed and the temperature and other conditions used in the polymerisation process, but it appears that usually the principal reactions which take place are the formation of the carbamic acid and urea types of linkage when urea radicles are involved and similar reactions when thiourea or guanidine radicles are involved.

Diureas may be produced by reacting two molecular equivalents of urea with one molecular equivalent of a dihalogenated compound. Thus, two molecular equivalents of urea may be reacted with one molecular equivalent of a dihalogenated paraffin, for example 1:6-dibromhexane, to give a straight chain compound having a urea radicle at each end. A similar compound may be obtained by reacting one molecular equivalent of a diamine, e. g. 1:10-diamino decane, with two molecular equivalents of carbamyl chloride. Hydroxy-ureas may be produced by reacting metal isocyanates with hydrochlorides of primary amino-alcohols, and hydrocarbon substitution derivatives thereof may be obtained from amino-alcohols and isocyanate esters or from secondary amino-alcohol hydrochlorides and metal isocyanates. Thiourea compounds may be obtained in a similar manner from isothiocyanates.

When a hydroxy-urea or the like is produced as described in the preceding paragraph, the production of the polymer may follow directly without isolation of the hydoxy-urea or the like by heating the reaction mixture under the appropriate conditions. Preferably, however, it is first isolated, particularly when produced from a metal isocyanate, on account of the by-product formed.

The production of di-ureas, di-thioureas or the like from isocyanates and their conversion into polymers may be carried out in a similar manner, using the required proportions of diamine or diamine hydrochloride, isocyanate or isothiocyanate and glycol.

Guanidine compounds may be produced by heating diamines or amino-alcohols with cyanamide and a little ammonia or by heating guanidine with dihalogenated compounds or halogenated alcohols.

The compounds which it is preferred to employ in the production of polymers by the present process are aliphatic compounds in which the reactive radicles are linked by methylene groups, examples of such compounds being trimethylene, tetramethylene, hexamethylene and decamethylene di-ureas, di-thioureas and di-guanidines, the corresponding glycols and the corresponding hydroxy-ureas, hydroxy-thioureas and hydroxy-guanidines. Similar compounds containing one urea radicle and one thiourea radicle may also be employed. Compounds having substituent radicles attached to the main chain may be employed, as may urea compounds and the like having substituent radicles attached to the nitrogen atoms, provided that the radicles in question are not reactive under the polymerisation conditions employed and do not in consequence lead to the formation of cross linkages. Examples of such compounds are hexane diol (1:5), 2-methyl pentane diol (2:5), 2:6 dimethyl octane diol (3:8), 1:5 di-ureido-octane and the N-ethyl hexamethylene di-ureas. Compounds may also be employed in which the chains linking the two reactive radicles contain other atoms as well as carbon atoms, for example oxygen, sulphur or nitrogen atoms. Examples of such compounds are diethylene glycol, di-(hydroxy-ethyl) sulphide and diethanolamine and the corresponding hydroxy-guanidines, hydroxy-ureas, hydroxy-thioureas, di-ureas, di-thioureas and di-guanidines. Aromatic compounds, e. g. dihydroxy-benzenes and phenylene di-ureas, may also be used. The use of any of these types of reagents instead of the preferred type generally yields polymers having lower melting points than those of similar polymers obtained from the preferred type of reagents, and they are therefore usually more suitable when the polymer is to be used, for example, for the production of coating compositions or moulded articles than for polymers to be used for the production of textile materials.

Polymers containing urea residues have also usually higher melting-points than similar polymers containing thiourea or guanidine residues and are therefore preferred for the production of filaments and the like.

The positions of the reactive radicles in the reagent or reagents employed should not be such that the radicles are capable of reacting to form cyclic compounds containing less than eight atoms, particularly from 4 to 7 atoms, in the ring, since otherwise such a reaction is liable to occur to the detriment of the polymer-forming reaction. Thus the hydroxy and urea radicles in hydroxy-ureas employed should preferably be separated by at least five atoms.

When more than one reagent is employed, the proportions of the different reagents should be so chosen that there is no great excess of hydroxy groups, otherwise polymerisation may be stopped at an early stage by the formation of macromolecules which all have hydroxy groups at both ends. Usually it is preferably to have approximately the same number of hydroxy groups and urea groups or the like in the reaction mixture e. g. up to about 10% excess of either, though a large excess of urea groups or the like is sometimes admissible, as they can react to form biuret or similar groups, as indicated above. A slight excess of one or the other groups or the presence of a small proportion of a reagent which can react with only one group, e. g. a mono-alkyl chloride or a mono-alcohol, may be desirable in order to stabilise the polymer and prevent further polymerisation if it is subsequently subjected to heat treatment, e. g. in the production of filaments by melt-spinning.

By a suitable selection of the reagent or the reagents employed polymers conforming with widely different requirements as regards physical properties, particularly melting point, may be obtained. For example, if the melting point of a polymer produced from hexamethylene di-urea and hexamethylene glycol is higher than is required, a similar polymer having a lower melting point may be obtained by substituting, for part of the hexamethylene di-urea or hexamethylene glycol, a di-thiourea, or a di-urea or glycol containing a larger number of carbon atoms, either in the chain or by reason of the presence of substituent radicles, the amount to which the melting point is lowered being dependent upon the relative proportions of the constituents of the reaction mixture. On the other hand, the properties of the resultant polymer may be modified by incorporating a different type of polymer-forming reagent in the reaction mixture, for example a di-carboxylic acid or a diamine or both. An almost infinite number of variations in the type and proportions of reagents is therefore possible and this carries with it the possibility of producing polymers conforming with widely different requirements.

The production of the polymers according to the process of the present invention is effected by heating the reactants at a suitable temperature, for example 150 to 200 or 250° C. or more, until a polymer having the desired properties is obtained. The reaction may be carried out under atmospheric pressure in its early stages but in general, in order to complete the reaction, it is desirable, particularly if a filament-forming product is required, to reduce the pressure very considerably, for example to 100, 50 or 5 mms. of mercury, or even to carry out the reaction in a molecular still, and to employ a fairly high reaction temperature, for instance between 220 and 280° C. It is desirable to remove relatively volatile by-products from the reaction medium as rapidly as possible and this may be assisted by passing an inert gas, for example nitrogen, through or over the reaction mixture. In any case it is desirable to carry out the reaction in an inert atmosphere, as in the presence of oxygen dark-coloured products may be obtained. The reaction may be carried out in the presence of a suitable inert liquid which is a solvent for the reactants, e. g. phenol, a cresol or a xylenol.

In order to obtain products having suitable properties for the formation of filaments, it is in general necessary to continue the reaction until the polymer has an average molecular weight of 6000 to 8000 or 10,000 or more. Polymers of lower average molecular weight, e. g. 3000 or 5000, though not usually suitable for the production of filaments, may be employed for the production of films, particularly coating films, and moulded products, in which high tenacity per unit of cross-section is of less importance. Preferably the reaction is stopped while the polymer is still soluble in suitable organic solvents, further polymerisation being effected, if desirable, after the polymer has been formed into filaments or other shaped articles.

The polymers may be purified by washing them with suitable liquids or by dissolving them up and then precipitating them. They may be employed for the manufacture of shaped articles. For example, filaments, foils and similar articles may be produced by extruding a solution of a polymer through a shaping device into a gaseous or liquid setting medium or by extruding a plastic or molten mass of the polymer through a shaping device and taking it up on a roller or other forwarding device. Filaments, films and similar products may be cold-drawn or stretched when they are in a softened condition under the influence of heat or of a suitable solvent, either continuously with their production or subsequently thereto.

The following examples illustrate the invention.

*Example I*

404 parts of hexamethylene-di-urea and 260 parts of hexamethylene glycol (10% excess) were carefully mixed and heated at 180–190° C. in a nitrogen atmosphere in a closed vessel provided with an inlet and outlet for nitrogen, a connection to a vacuum pump and a thermometer pocket. A current of nitrogen was passed through the apparatus during the heating in order to carry off volatile by-products. After about 3 hours a low polymer was obtained which had no fibre-forming properties. The temperature was then raised to about 250–260° C. and heating continued under a pressure of 50–60 millimetres for about 5 hours. At the end of this period a product was obtained which had fibre-forming properties and was capable of forming films from the melt. It had a nitrogen content of about 13% and was probably a mixed poly-urea-polyurethane.

*Example II*

606 parts of hexamethylene di-urea and 354 parts of hexamethylene glycol were mixed with 1000 parts of metacresol and heated in a current of nitrogen for about 3 hours at 220–230° C. in an apparatus similar to that used in Example I. The product formed at this stage had no fibre-forming properties. The temperature was then raised to 260–270° C. and the pressure reduced to 5–10 millimetres. After about 3 hours under these conditions a hard polymer was obtained which had good fibre-forming properties.

*Example III*

220 parts of pentamethylene di-thiourea and 118 parts of hexamethylene glycol were carefully mixed and heated in a nitrogen atmosphere in a closed vessel provided with an inlet and outlet for nitrogen, a connection to a vacuum pump and a thermometer pocket. A current of nitrogen was passed through the vessel during the heating to carry off volatile by-products. Heating was begun at 100° C. and the temperature was gradually raised during 3 hours to 220–240° C. The pressure was then reduced to 10–20 mms. and heating continued at the same temperature for about 3 hours until a fibre-forming product was obtained.

*Example IV*

A fibre-forming polymer obtained as described in Example II was extruded through a jet having a diameter of .5 millimetre under a nitrogen pressure of 10 lbs. per square inch and at a temperature of 190° C. The extruded filament was stretched by passage round two rollers, the second of which had twice the peripheral speed of the first, and was then taken up on a bobbin.

Polymers obtained by the process of the present invention may be reacted with other compounds, either before or after their conversion into shaped articles, in order to modify their properties. They may, for example, be alkylated with methyl chloride or diethyl sulphate or oxyalkylated with ethylene chlorhydrin. Again, they may be reacted with sulphur chloride, sulphuryl chloride or thionyl chloride in order to introduce sulphur into the molecule.

Having described my invention what I desire to secure by Letters Patent is:

1. Process for the production of linear polymers, which comprises heating a reaction mass containing organic molecules each of which contains only two reactive radicles linked by a polymethylene chain containing more than 2 and less than 11 chain atoms, said radicles being alcoholic hydroxy radicles, and radicles having the formula:

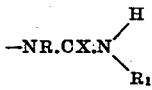

where R and R₁ is each selected from the class consisting of hydrogen atom and hydrocarbon radicles and X is selected from the class consisting of oxygen atom, sulphur atom and =NH group, being the sole reactive radicles in the reaction mass, and being in such positions in the molecules that cyclic compounds containing less than eight atoms in the ring cannot be formed, the proportion of hydroxy radicles to

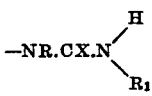

radicles being such that there is at most only a slight excess of hydroxy radicles in the reaction mass, heating being continued until a polymer having film-forming properties has been produced.

2. Process for the production of linear polymers, which comprises heating a reaction mass containing organic molecules each of which contains only two reactive radicles linked by a polymethylene chain containing more than 2 and less than 11 chain atoms, said radicles being in such positions in the molecules that cyclic compounds containing less than 8 atoms in the ring cannot be formed and the total number of reactive radicles being made up of approximately equal numbers of alcoholic hydroxy radicles and of radicles having the formula

where R and $R_1$ is each selected from the class consisting of hydrogen atom and hydrocarbon radicles and X is selected from the class consisting of oxygen atom, sulphur atom and =NH group, heating being continued until a polymer having film-forming properties has been produced.

3. Process for the production of linear polymers, which comprises heating organic molecules each of which contains as sole reactive radicles an alcoholic hydroxy radicle and a radicle having the formula

where R and $R_1$ is each selected from the class consisting of hydrogen atom and hydrocarbon radicles and X is selected from the class consisting of oxygen atom, sulphur atom and =NH group, said radicles being separated by a polymethylene chain of at least five and not more than 10 chain atoms, heating being continued until a polymer having film-forming properties has been produced.

4. Process for the production of linear polymers, which comprises heating a reaction mass containing a dihydroxy organic compound, wherein the hydroxy radicles are the sole reactive radicles in the compound and are alcoholic hydroxy radicles, and an approximately equimolecular amount of an organic compound containing as sole reactive radicles two radicles having the formula

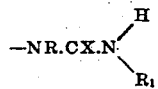

where R and $R_1$ is each selected from the class consisting of hydrogen atom and hydrocarbon radicles and X is selected from the class consisting of oxygen atom, sulphur atom and =NH group, said

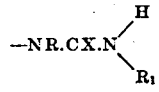

radicles being separated by a polymethylene chain containing more than 2 and less than 11 chain atoms, heating being continued until a polymer having film-forming properties has been produced.

5. Process for the production of linear polymers, which comprises heating an organic compound having the formula

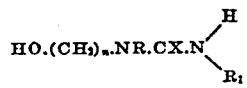

where $n$ is at least five and not more than 10, R and $R_1$ is each selected from the class consisting of hydrogen atom and hydrocarbon radicles and X is selected from the class consisting of oxygen atom, sulphur atom and =NH group, heating being continued until a polymer having fibre-forming properties is obtained.

6. Process according to claim 5, wherein at least part of the heating is carried out at a temperature between 220 and 280° C. under reduced pressure.

7. Process for the production of linear polymers, which comprises heating a reaction mass containing an organic compound having the formula $HO.(CH_2)_n.OH$, where $n$ is an integer greater than 2 and less than 11, and an approximately equimolecular amount of an organic compound having the formula

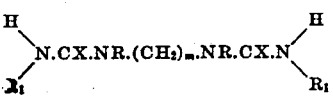

where $m$ is an integer greater than 2 and less than 11, R and $R_1$ is each selected from the class consisting of hydrogen atom and hydrocarbon radicles and X is selected from the class consisting of oxygen atom, sulphur atom and =NH group said hydroxy radicles and

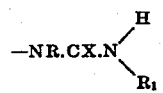

radicles being the sole reactive radicles present in the reactive mass, heating being continued until a polymer having fibre-forming properties is obtained.

8. Process according to claim 7, wherein at least part of the heating is carried out at a temperature between 220 and 280° C. under reduced pressure.

9. Process for the production of highly polymeric compounds, which comprises heating a reaction mass containing approximately equimolecular amounts of hexamethylene glycol and hexamethylene diurea, heating being continued until a polymer having fibre-forming properties is obtained.

10. Process according to claim 9, wherein at least part of the heating is carried out at a temperature between 220 and 280° C. under reduced pressure.

11. Process for the production of highly polymeric compounds which comprises heating a reaction mass containing approximately equimolecular amounts of pentamethylene di-thiourea and hexamethylene glycol, heating being continued until a polymer having fibre-forming properties is obtained.

12. Process according to claim 11, wherein at least part of the heating is carried out at a temperature between 220 and 280° C. under reduced pressure.

HENRY DREYFUS.